United States Patent [19]

Lyke

[11] Patent Number: 5,261,056
[45] Date of Patent: Nov. 9, 1993

[54] N-PORT WIDE BANDWIDTH CROSS-LINK REGISTER

[75] Inventor: James C. Lyke, Albuquerque, N. Mex.

[73] Assignee: The United States of America as represented by the Secretary of the Air Force, Washington, D.C.

[21] Appl. No.: 891,100

[22] Filed: Jun. 1, 1992

[51] Int. Cl.⁵ .............................................. G06F 13/00
[52] U.S. Cl. ..................................... 395/275; 395/200
[58] Field of Search ..................... 364/238, 241.9, 200; 395/200, 275

[56] References Cited

U.S. PATENT DOCUMENTS

| | | | |
|---|---|---|---|
| 4,161,790 | 7/1979 | Winston | 365/94 |
| 4,207,609 | 6/1980 | Luiz et al. | 364/200 |
| 4,264,984 | 4/1981 | Anderson | 364/900 |
| 4,419,728 | 12/1983 | Larson | 364/200 |
| 4,665,483 | 5/1987 | Ciacci et al. | 364/200 |
| 4,740,894 | 4/1988 | Lyon | 364/200 |
| 4,748,656 | 5/1988 | Gibbs et al. | 379/93 |
| 4,852,021 | 7/1989 | Inoue et al. | 364/200 |
| 4,875,157 | 10/1989 | Frimmel, Jr. et al. | 364/200 |
| 4,894,797 | 1/1990 | Walp | 364/900 |
| 4,907,228 | 3/1990 | Bruckert et al. | 371/68.3 |
| 4,916,704 | 4/1990 | Bruckert et al. | 371/68.3 |
| 4,975,901 | 12/1990 | Poli | 370/58.1 |
| 4,994,963 | 2/1991 | Rorden et al. | 364/200 |

Primary Examiner—Dale M. Shaw
Assistant Examiner—Christopher B. Shin
Attorney, Agent, or Firm—Bernard E. Franz; Thomas L. Kundert

[57] ABSTRACT

The cross-link register allows multiple digital processors to pass data and control parameters to a common region. The N-port wide bandwidth crosslink register (WBCR) represents a method for interconnection of N different digital interconnection units (DIUs). The WBCR comprises a group of registers, multiplexers, and a clock circuit, in which: (1) each DIU has write access to only one register which is dedicated to it; (2) each DIU has guaranteed read access to the dedicated registers of any other DIU; and (3) all DIUs may be run asynchronously. The output of each register is routed to the input of each multiplexer. The address lines of each port allow the selection of the output of the particular register, including the register associated with the calling port (for example, port 1 can access all registers, including register 1). The clock establishes the refresh interval of the registers, which are assumed to be collections of master-slave data flip-flops. Hence, any DIU may update its own register (only), but this data cannot be accessed by any other DIU until the register is clocked, in which case the data at the input is transferred to the output.

2 Claims, 4 Drawing Sheets

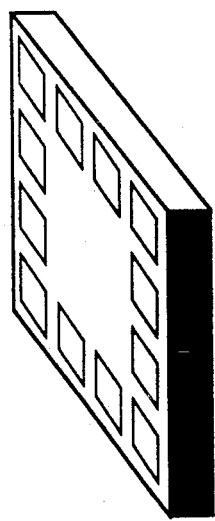
Fig. 5a Normal Die
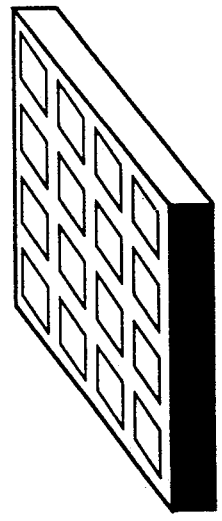
Fig. 5b Die with interior bond pads
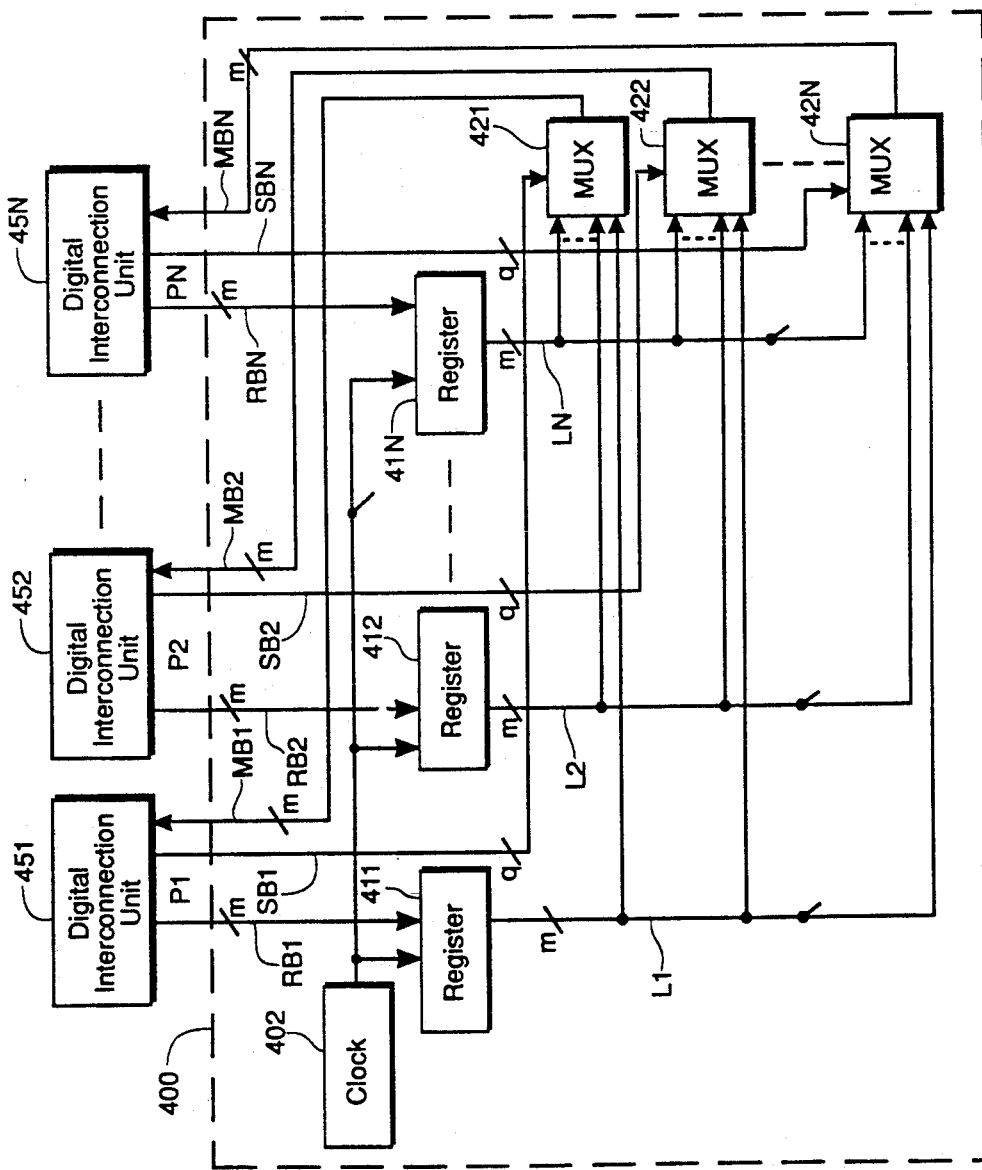
Fig. 4

N-PORT WIDE BANDWIDTH CROSS-LINK REGISTER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to an N-port wide bandwidth cross-link register, and more particularly to apparatus for passing data and control signals between processors or other digital interconnection units of a parallel computer system.

Bandwidth in this context refers to the data throughput of a port connected between two digital interconnection units (DIUs). The factors which affect bandwidth are (1) the frequency at which discrete data are transmitted on individual interconnections between DIUs, (2) the protocol of transmission (such as simplex, duplex, and provisions or error correction-detection schemes, which improve the reliability of operation in the presence of noise but degrade bandwidth), and (3) most importantly for the present invention, the number of interconnections between DIUs.

One of the dilemmas with modern digital processing is that it is often performed with stored-program or Von Neumann computers. These computers may consist of many thousands of individual electronic components, but the method of program execution is not optimal, since each instruction is executed one-by-one. This bottleneck has been the dogma of computer architects, who have long sought ways to effect more efficient use of the hardware available. One of the most obvious techniques to improve the efficiency of Von Neumann computers is to operate more than one of them at the same time.

Concepts involving the application of parallel Von Neumann computers have been emerged in several forms. One class of architectures features large groups of specialized, identical processing elements. Such architectures are said to possess fine granularity. Examples include vector processors and systolic arrays. These architectures typically have limited flexibility in application. Other forms of parallelism employ a few identical, relatively powerful (often specialized) processors, arbitrated by another processor (usually a general-purpose computer of more modest capability). These architectures are sometimes said to possess coarse granularity. Again, these architectures are often limited to performing specialized, high-throughput processing applications such as digital signal processing. Other processing applications feature networks of identical general-purpose or special-purpose processors interconnected in various topologies. Examples of these topologies include ring-bus, mesh, and hyper-cube architectures. Although more general applications may be pursued by the latter architectures, the overall throughput of the network is sub-optimal. The major reasons for the loss of efficiency are that: (1) each node is only connected to a few other processors, and (2) in some cases, a number of processors can access common buses, but they cannot do so simultaneously. In the latter case, a technique known as collision-sensing, multiple access (CSMA) arbitration is used to detect attempts by two or more nodes to simultaneously access a common bus. Unfortunately, when a collision occurs, one or more of the nodes must back up and access an auxiliary bus and/or wait for a statistically-determined interval to re-access the same bus.

The following United States patents are of interest.
U.S. Pat. Nos.
4,161,790—Winston
4,907,228—Bruckert et al
4,916,704—Bruckert et al.

The patent to Winston teaches a method of loading a multi-digit binary work to an electronic circuit board. U.S. Pat. No. 4,907,228 to Bruckert teaches a dual processor computer system for executing a series of instructions. U.S. Pat. No. 4,916,704 to Bruckert teaches a fault tolerant computer system having duplicate computer systems that operate simultaneously.

SUMMARY OF THE INVENTION

An objective of the invention is to provide a crosslink register which allows multiple digital processors to pass data and control parameters to a common region, with no interference of access due to bus throughout (or bandwidth) limitations.

The invention relates to a digital processor system which allows multiple digital processors to pass data and control parameters to a common region. The N-port wide bandwidth crosslink register (WBCR) represents a method for interconnection of N different digital interconnection units (DIU). N in this context is an integer greater than one. The unique aspects of the invention are: (1) each DIU has write access to only one register which is dedicated to it; (2) each DIU has guaranteed read access to the dedicated registers of any other DIU; and (3) all DIUs may be run asynchronously. The WBCR comprises a group of registers, multiplexers, and a clock circuit. The output of each register is routed to the input of each multiplexer. The address lines of each port allow the selection of the output of the particular register, including the register associated with the calling port (for example, port 1 can access all registers, including register 1). The clock circuit establishes the refresh interval of the ensemble of registers, which are assumed to be collections of master-slave data flip-flops (but without loss of generality, can be other forms of digital storage). Hence, any DIU may update its own register (only), but this updated data cannot be accessed by any other DIU until the register is clocked, in which case the data at the input is transferred to the output.

ADVANTAGES AND NEW FEATURES

The advantages of the WBCR are that: (1) various processors and other digital units may be interconnected; (2) all interconnecting processors have guaranteed simultaneous access to the WBCR; (3) read and write operations can take place simultaneously for each DIU; and (4) testability is enhanced, since the demarcations between processors are well defined.

The new features of the WBCR include the extraordinary input-output requirements. These requirements press the limits of traditional printed wiring board and single chip package technology. In fact, it is believed that no device like the WBCR has been constructed on a large scale ($N > 12$, $m > 16$) due to the inability of modern very large scale integration (VLSI) technology to achieve the necessary "pinout" requirements. As mentioned previously, however, it is believed that wafer scale integration (WSI) can meet these requirements.

Another new feature of the WBCR is the potential for all interconnecting systems to run asynchronously. Since all ports have equal access at all times, the need for ultra-tight, regimented synchronization in the parallel architecture is not needed. Typically, this regimentation would be needed to provide "time windows" for each processor to have access opportunities. However, in the case of the WBCR, such regimentation is unnecessary, and the systems designer has complete control over system coupling and data latency. When required, synchronization can be employed through software semaphores, which substantially enhance flexibility, particularly for heterogeneous architectures.

An additional feature of the WBCR pertains to fault tolerance. The WBCR can serve as a mechanism to improve the fault-tolerance of an overall system, since one or more processors can idle while monitoring status of other processors, again through software semaphores. When invalid status information is perceived, the idling processor can "go active" and potentially effect system recovery. More sophisticated software designs are possible. Such designs could allow individual DIUs to operate at relatively low throughput, with no redundancy. When a fault occurs, the bad DIU can similarly be circumvented, with the extra throughput being taken up by the remaining DIUs.

BRIEF DESCRIPTION OF THE DRAWING

FIG. 4 is a block diagram showing an implementation of the WBCR;

FIG. 5a shows a normal die for integrated circuit chips;

FIG. 5b shows a die with interior bond pads, for an input/output arrangement for a monolithic IC implementation of the WBCR.

DETAILED DESCRIPTION

Figure 1:
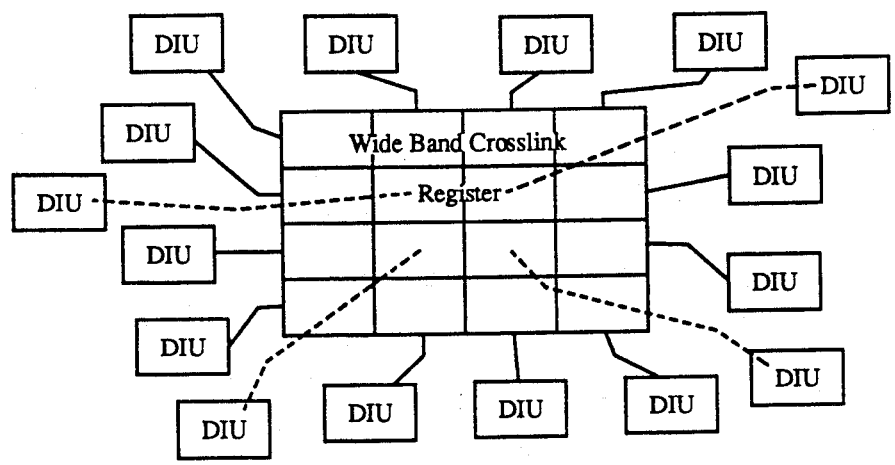
FIG. 1 is a block diagram of a wide bandwidth crosslink register (WBCR)

The purpose of the N-port wide-bandwidth crosslink register (WBCR) is to allow multiple digital processors to pass data and control parameters to a common region. N in this context is an integer greater than one. A general block diagram of the WBCR is shown in FIG. 1. In this common region, these parameters can be accessed by all processors through ports which are available to each processor. Since each processor has a dedicated port, the time delays and synchronization problems usually associated with direct memory access schemes that involve multiple processors are circumvented. Thus, the problems associated with the scheduling of these shared resources are eliminated. In fact, all devices connected to the WBCR may be run asynchronously, since complete access is guaranteed. Other implications of the loose timing requirements are that many different processor types may be integrated. Not only can different special purpose and general purpose computers of varying complexity be placed at each node, but so can any other digital device, such as an analog-to-digital converter. Unused ports can be used for test access, thereby providing insight to the activity at any other port. Since each device can only change the register associated with its port, it is possible to develop fault-tolerant schemes which take advantage of this isolation. Unlike many other processor schemes, the WBCR can provide sufficient independence among its processors such that the system can continue to function, even if one or more of its constituent processors "runs amok" or fails altogether.

Figure 2:
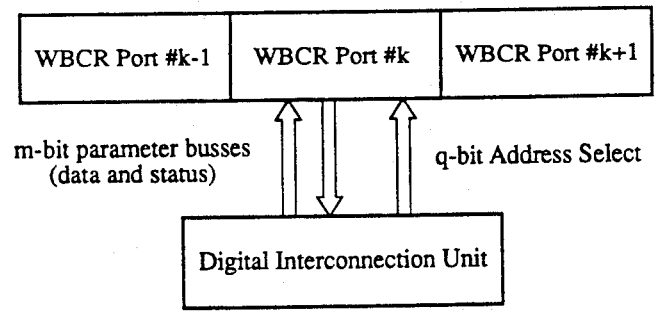
FIG. 2 is a block diagram showing a close-up of a port interface between a digital interconnection unit and the WBCR.
Figure 3:
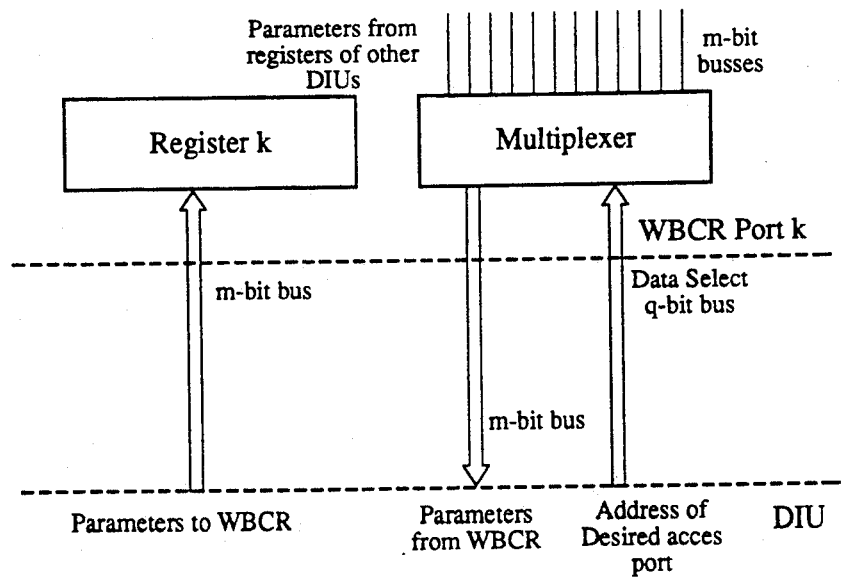
FIG. 3 is a block digram of the interface at a port.

Several diagrams of a WBCR are presented in FIGS. 1 to 3. FIG. 1 is a block diagram of the WBCR. FIG. 2 is a close-up of a port interface between a digital interconnection unit and the WBCR. FIG. 3 is a detailed view of the interface at a port k.

Ideally, large N WBCRs would be constructed (N>16). When the device was originally conceived, applications for N=64 were being pursued.

The N-port WBCR comprises N input/output ports, N registers, and an independent clock to synchronize these registers.

Each input/output port comprises a data/control port and an address decoder. The data/control port is m-bits wide, with m defined by $$m = d + c$$

where d is the number of data bits (usually 8, 16 or 32) and c is the number of control bits. The d-bit data word is thought of as that passed through the data bus of a computer, while the c-bit control word is similar to a status register of a computer. It is anticipated that the bits of the control word would be utilized as flags to signify error conditions, interrupt requests, or readiness indications from the associated digital interconnection unit (DIU). More generally, these bits would be used for a variety of applications for software semaphores.

The address decoder is a g-bit input bus to the WBCR, where g is defined as;

$$q = \begin{bmatrix} \log_2 N, & \text{I.P.O.}(\log_2 N) = \log_2 N; \\ \log_2(N) + 1, & \text{I.P.O.}(\log_2 N) \neq \log_2 N; \end{bmatrix}$$

This defines the minimum number of bits required to address each register in the WBCR.

The N registers of the WBCR are also m bits wide. If the ith address decoder references the ith register, then the data appearing on the ith port from the DIU is written in the ith register. If the ith address decoder references the jth register (i≠j), then the data present in the jth register appears on the ith port.

The data registers are synchronized by an independent clock. It is expected that in practice the clocking rate will be made as fast as possible, at least as fast as the fastest DIU. To do otherwise may necessitate the introduction of wait states in DIUs which operated at higher clocking frequencies.

A typical implementation for a WBCR 400 is shown in FIG. 4. The WBCR comprises a group of N registers 411–41N, multiplexers 421–42N and a clock circuit 402. The output of each register is routed to an input of each multiplexer, via m-bit buses L1–LN. The WBCR 400 has N ports P1–PN connected respectively to N digital interconnection units 451–45N. Port P1 has an m-bit input bus RB1 connecting the unit 451 to the register 411, a q-bit address bus SB1 connecting the unit 451 to the multiplexer 421, and an m-bit bus MB1 connecting the output of the multiplexer 421 to the unit 451. Similarly, the ports P2-PN have input busses RB2-RBN to the registers 412-41N respectively, address busses SB2-SBN to the multiplexers 422-42N respectively, and output busses MB2-MBN from the multiplexers 422-42N respectively.

The address lines of each port allow the selection of the output of the particular register, including the register associated with the calling port (for example, port 1 can access all registers, including register 1). The clock establishes the refresh interval of the registers, which are assumed to be collections of master-slave data ("D") flip-flops (but may in principle, be any of a number of different latch types). Hence, any DIU may update its own register (only), but this data cannot be accessed by any other DIU until the register is clocked, in which case the data at the input is transferred to the output.

A crucial feature of the WBCR is the large input-output (I/O) requirement, Based on FIG. 4, the number of individual (I/O) lines required by an N-bit WBCR are estimated by the following equation:

$$\text{NoofPins} = \text{Clocklines} + \text{Powerlines} + N \cdot m + q \cdot N$$
$$\approx \text{I.P.O.}\left(3\frac{N}{10} + 3\right) + 2N \cdot m + q \cdot N$$

For example, the number of I/O lines required for a 32-port device with a 37-bit parameter bus width would be calculated as 2,508. The term in the above equation for clock and power lines is an estimate based on the assumption that distributed clock and power signals would be used in the design. The estimate proposes one set of clock and power lines for every ten ports, under this assumption. The estimate also assumes a single-voltage supply and single-phase clock.

The implementation of large WBCRs, such as the one in the above example, are not practical with existing VLSI technology. The implementation of a large WBCR will be presumably in a monolithic integrated circuit (IC), with the I/O pads distributed throughout the top surface of the IC, as shown in FIG. 5b. This is different from normal monolithic implementations, which place I/O pads about the periphery only for conventional designs, as shown in FIG. 5a. The only currently existing technologies which could feasibly implement a large WBCR would be a multi-chip module or wafer scale integration technology featuring area interconnection capabilities. In principle, such a technology would be able to provide up to 4444 interconnections on a die with the dimensions of 0.2×0.2 inch and with a I/O pad pitch of 0.003 inches (FIG. 5).

Figures 6, 6A:
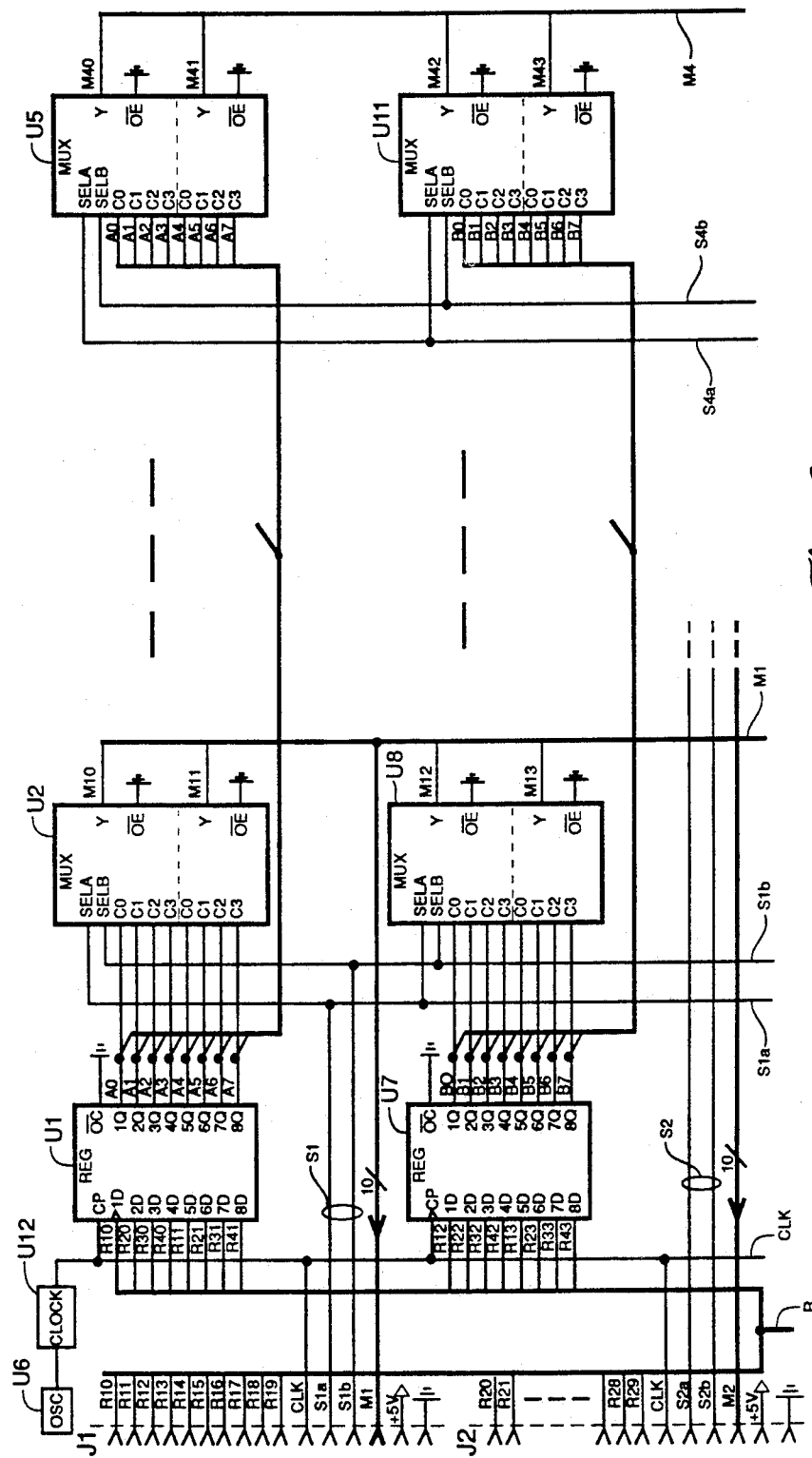
FIG. 6a and 6b, when arranged shown in FIG. 6, comprise a functional block diagram showing one embodiment of a crosslink register.
Figure 6B:
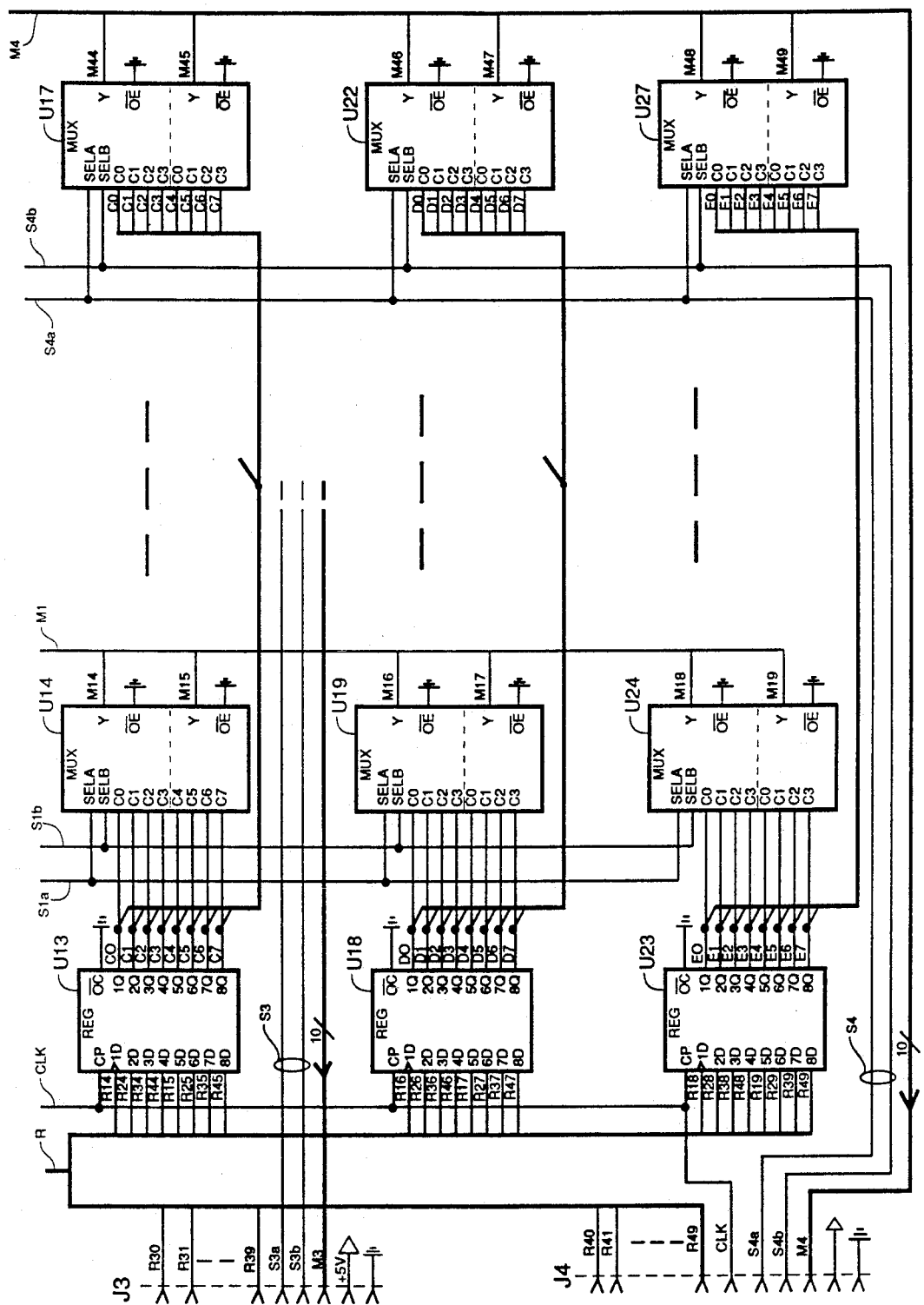

FIGS. 6a and 6b, when arranged as shown in FIG. 6, comprise a functional block diagram showing one embodiment of a crosslink register, having four ports, which has been built and tested. The four ports are represented by four jacks J1, J2, J3 and J4 at the left of FIGS. 6a and 6b. The input and output busses each have ten bit lines, and the address busses each have two bit lines. Thus for this embodiment, N=4, m=10, and q=2.

For the first port, the input bus is shown at jack J1 as comprising ten leads R10, R11-R19, the address bus S1 comprises two leads S1a and S1b, and the output bus is shown as a 10-lead cable M1. There are also terminals for a lead CLK from a clock U12, +5 volts and ground. The other ports have similar connections at the jacks J2, J3 and J4.

The four registers are implemented with five type HC374 octal D-type flip-flop IC chips U1, U7, U13, U18 and U23. The first register comprises the first and fifth flip-flops of each of the five chips, the second register comprises the second and sixth flip-flops of each of the five chips, the third register comprises the third and seventh flip-flops of each of the five chips, and the fourth register comprises the fourth and eighth flip-flops of each of the five chips. Thus the register IC U1 has its inputs 1D and 5D connected via leads R10 and R11 from jack J1, leads R20 and R21 from jack J2, leads R30 and R31 from jack J3, and leads R40 and R41 from jack J4. Similarly the other register ICs have inputs from each of the four jacks, down to the last register IC U23 having inputs R18, R28, R38, R48, R19, R29, R39 and R49 connected to its inputs 1D-8D respectively.

The four multiplexers are implemented in twenty type HC253 dual multiplexer IC chips, each of the two units of each IC having four inputs designated C0, C1, C2 and C3, and an output designated as Y. The multiplexer IC chips are shown in five rows of four ICs each, with only the first and fourth IC shown in each row. The multiplexer for the first port comprises the five ICs U2, U8, U14, U19 and U24 in the first column, with the ten Y outputs connected via leads M10, M11-M19 of bus M1 to the jack J1, and in like manner the multiplexer for each of the other three ports comprises a column of five ICs, with their Y outputs connected via busses M2, M3 and M4 to the jacks J2, J3 and J4 respectively. Each of the two units of each multiplexer IC has a "not OE" terminal which is grounded so that the output is enabled at all times. Each multiplexer IC has select inputs SELA and SELB which selects one of the four C inputs for both units. From jack J1, the address bus S1 with leads S1a and S1b is connected to the select inputs of all five of the ICs in the first column, and the address busses from the other three jacks are connected respectively to multiplexer ICs in the other three columns.

The clock U12 comprises a type HC4020 IC chip having outputs Q1-Q14 coupled via a connecting board (not shown) to the lead CLK for selecting which of the fourteen outputs are connected. The clock input of U12 is connected to the output of a one-MHz oscillator U6.

In each row of FIGS. 6a and 6b, the eight outputs of one register IC are connected to the eight C inputs of each of the four multiplexer ICs of that row. Thus, the register IC U1 has its eight Q outputs at leads A0-A7 connected to the C inputs of each of the four multiplexer ICs U2-U5, down to the register IC U23 which has its eight Q outputs at leads E0-E7 connected to the C inputs of each of the four multiplexer ICs U24-U27. These connections form the four links from the registers to the multiplexers, with the link from the first register comprising leads A0, A4, B0, B4, C0, C4, D0, D4, E0 and E4. The link from the second register comprises leads A1, A5, B1, B5, C1, C5, D1, D5, E1 and E5. The link from the third register comprises leads A2, A6, B2, B6, C2, C6, D2, D6, E2 and E6. The link from the fourth register comprises leads A3, A7, B3, B7, C3, C7, D3, D7, E3 and E7.

ALTERNATIVES

Alternative implementations of the DIU have been explored. One such implementation would reduce the I/O requirement by N * M signal lines, at the expense of added complexity. In the original version, a DIU can access the data in its own register. The alternative implementation would not allow this access to occur. Instead, whenever a DIU addresses its own register, the write enable lines for that register are activated. Hence, the register is loaded by this action. As a consequence of this change, the need for separate lines to the DIU for driving the register are eliminated. However, not only is the resulting implementation more complicated, but write and read operations can no longer occur simultaneously. Hence, the I/O bandwidth is reduced.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A cross-link register unit for multiple digital units including digital processors to pass data and control parameters to a common region and to read the data and control parameters from the common region;

the cross-link register unit has N ports for interconnection of N different digital units and comprises N registers, N multiplexers, and a source of clock signals, N being an integer greater than three, each port (such as P2) having one of the registers (412) and one of the multiplexers (422) individual thereto, wherein each port includes terminals for m leads of a write bus (RB2), m leads of a read bus (RB2), and q leads of an address bus (SB2), wherein said terminals for each port connected to one of said digital units;

said one of the registers (412) for each said port (P2) comprises m bistable devices each having a register input and a register output, with the register inputs coupled only to the write bus (RB2) of said port (P2) to which it is individual and the register outputs coupled via an m-lead link (L2) to each of the multiplexers, the source of clock signals being coupled to each register to set the bistable devices so that data at the inputs appears at the outputs, each digital unit (452) has write access to only its individual register (412);

said one of the multiplexers (422) for each said port (P2) has N sets of inputs of m leads each, connected respectively to the links from the N registers, m multiplexer outputs coupled to the read bus (RB2) of the port (P2) to which the multiplexer is individual, and q address inputs connected to the address bus (SB2) of the port (P2) to which the multiplexer (422) is individual, and address means in said one of the multiplexers (422) for each said port coupled to its address inputs for selecting one of said N registers designated by an address encoded on its address bus (SB2) and coupling the set of m inputs from the link from that register to the multiplexer outputs, each digital unit has read access to all N registers.

2. A cross-link register unit according to claim 1, using wafer scale integration with input/output pads distributed throughout one surface of an integrated circuit chip, wherein N is greater than 12 and m is greater than 16.

* * * * *

UNITED STATES PATENT AND TRADEMARK OFFICE
CERTIFICATE OF CORRECTION

PATENT NO. : 5,261,056
DATED : November 9, 1993
INVENTOR(S) : James C. Lyke

It is certified that error appears in the above-identified patent and that said Letters Patent is hereby corrected as shown below:

Column 2, line 22, "throughout" should be -- throughput --.
Column 3, line 44, -- as -- should precede "shown".
Column 5, line 22, the parentheses should be deleted.
Column 8, line 2 (claim 1), -- (452) -- should follow "units".

Signed and Sealed this

Fourteenth Day of June, 1994

Attest:

BRUCE LEHMAN

Attesting Officer　　　Commissioner of Patents and Trademarks